May 19, 1953   R. C. RAYNER   2,638,762
OVERLOAD RELEASE COUPLING
Filed July 22, 1947
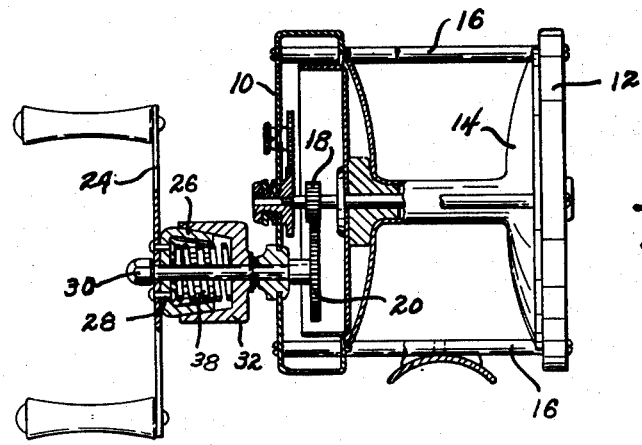
*Fig.1*
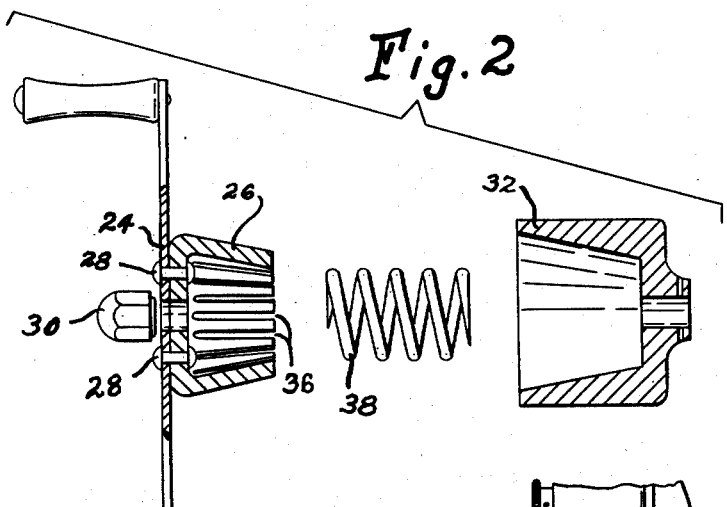
*Fig.2*
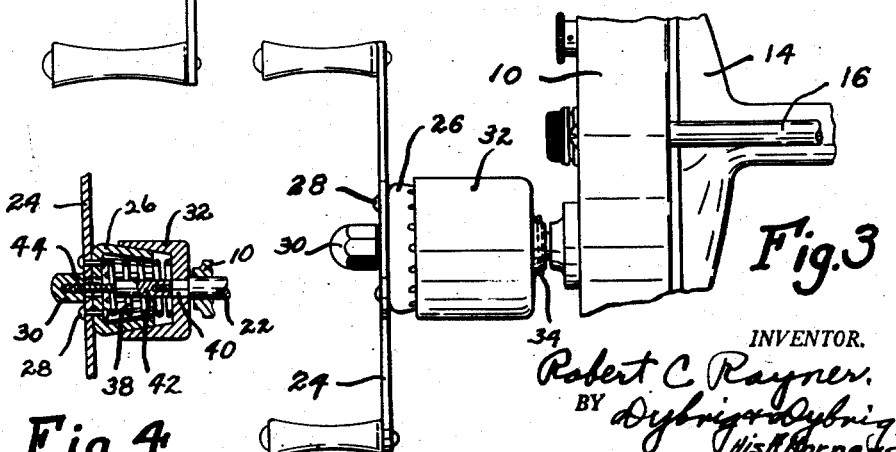
*Fig.3*
*Fig.4*
INVENTOR.
Robert C. Rayner.
BY Dybvig & Dybvig,
His Attorneys.

UNITED STATES PATENT OFFICE 2,638,762

OVERLOAD RELEASE COUPLING

Robert C. Rayner, Dayton, Ohio

Application July 22, 1947, Serial No. 762,564

1 Claim. (Cl. 64—30)

This invention relates to a fishing reel, and more particularly to a fishing reel in which a clutch is provided between the reel handle and the spool on which the fish line is wound.

It frequently happens that a fisherman will have his line broken while reeling in a large fish or will lose his fish due to the fish giving a sudden jerk on the line. While some skilled fishermen may be able to think and act fast enough to let out additional line in such an emergency, there are many who fail to let go of the handle so as to give the fish the necessary extra line. It is an object of this invention to provide a reel in which the danger of breaking the line or losing the fish under the above circumstances is largely eliminated.

Thus, it is an object of this invention to provide a fishing reel in which the spool or reel proper is free to rotate independently of movement of the handle in the event that the pull on the line approaches or exceeds the force required to break the line.

Another object of this invention is to provide an inexpensive clutch arrangement for use in a fishing reel.

Another object of this invention is to provide a safety clutch means which may be installed on existing fishing reels by the users of the reel.

Further objects and advantages of the present invention reside in the construction and combination of parts and in the mode of operation as will be apparent from the following description, reference being had to the accompanying drawings wherein a preferred form of the present invention is clearly shown.

In the drawings:

Figure 1 is an elevational view, with parts broken away, showing a fishing reel embodying my invention;

Figure 2 is an exploded view showing the clutch parts in section;

Figure 3 is an elevational view of a reel equipped with my improved clutch; and

Figure 4 is a fragmentary elevational view showing a modified arrangement for installing the clutch on a well-known make of reel.

Referring now to the drawings wherein I have shown a preferred embodiment of my invention, reference numerals 10 and 12 designate the end frame members of a reel assembly between which the spool or reel proper 14 is rotatably supported in accordance with conventional practice. The frame members 10 and 12 are held in spaced relationship by means of the spacer rods 16. The spool 14 is provided with a gear 18 which is arranged for engagement with the driving gear 20 mounted on the crank shaft 22. A reel operating handle 24 is provided which drives the shaft 22 through a clutch which comprises a pair of friction elements 26 and 32 constructed as shown. The handle 24 is attached to the clutch element 26 in any conventional manner such as by means of the rivets 28.

The handle 24 and the associated clutch element 26 are supported on the outer end of the crank shaft 22 and are held in assembled relationship on the shaft 22 by means of the adjustable nut 30. The clutch element 26 and the handle 24 are rotatable relative to the crank shaft 22 when the pull on the line exceeds that for which the clutch is adjusted. The cup shaped clutch element 32 is fastened to the shaft 22 in any suitable manner such as by means of the pin 34 and is arranged in frictional engagement with the outer surface of the clutch element 26. It will be noted that the rim of the clutch element 26 is provided with a plurality of slots 36 which increase the resiliency of the clutch element 26. The slots 36 cooperate with each other to form prong-like extensions, as clearly shown in Figure 2, resiliently engaging the other cup shaped clutch element. The friction surfaces of the clutch elements are preferably arranged at a 12 degree angle relative to the axis of the shaft 22. A coil spring 38 is arranged with its one end in engagement with the clutch element 32 and its other end in engagement with the clutch element 26 as shown. This spring tends to bias the clutch elements away from one another and consequently the spring together with the adjustable nut 30 determines the torque required to cause slippage of the clutch. The tension of the spring 38 may be adjusted by adjusting the nut 30 and the tighter the nut 30 is turned, the greater will be the tension on the spring 38 and the greater will be the clutching effect. By properly adjusting the nut 30 on the crank shaft 22 the clutch elements 26 and 32 may be adjusted so that the clutch will slip when the pull on the line approaches a pre-determined amount which normally would be slightly less than the pull required to break the fish line.

By virtue of the above described arrangement, it is apparent that the above clutch mechanism shown in Figures 1, 2 and 3 may be added to any fishing reel without the need for making major alterations in the reel and it is also apparent that the clutch may be adjusted to slip at any given pull on the line without the necessity for dismantling the reel or the clutch.

In Figure 4 of the drawing, I have shown a slightly modified clutch arrangement for installation on a well-known make of fishing reel without the necessity of making any major alterations in the reel and without the necessity for replacing any of the existing parts of the reel. As shown in Figure 4 of the drawing, the main crank shaft 22 of the reel is provided with a square portion 40 designed to fit into a square hole in the handle. In order to add my clutch to a reel having this type of drive shaft, the handle is removed and the clutch element 32 is slipped onto the square portion of the shaft 22 so as to replace the handle. The element 32 is provided with a square hole which fits onto the square shaft portion 40. A shaft extension element 42 is used which is screwed onto the shaft 22 to replace the original nut which held the handle in place on the shaft. The extension 22 has a threaded outer end 44 to which the adjustable nut 30 is secured. The remaining elements of the clutch are similar or identical in both construction and operation to the corresponding elements described in connection with Figures 1, 2 and 3 and need no further description.

For purpose of illustrating my invention, I have shown clutch arrangements of the type which may be attached to existing fishing reels whereas it is obvious that the clutch could be constructed as a part of the mechanism enclosed within the main gear housing.

Instead of using a clutch member consisting of conical members as shown, any other suitable type of clutch may be used, as for example, discs or other friction type clutches, or electromagnetic clutches.

While the form of embodiment of the invention as herein disclosed, constitutes a preferred form, it is to be understood that other forms might be adopted, all coming within the scope of the claim which follows.

Having thus described my invention, I claim:

A clutch for use in combination with a crank shaft of a fishing reel comprising in combination, a shaft extension secured to said crank shaft, a cup shaped clutch element nonrotatably secured to said crank shaft, an operating handle spaced from said shaft extension, a complementary cup shaped clutch element attached to said handle for rotation about said shaft extension, one of the clutch elements having slots therein forming resilient prong-like extensions mounted to resiliently contact the other clutch element, adjustable means holding said clutch elements in clutching engagement with one another, and spring means biasing said clutch elements out of clutching engagement, said spring means comprising a coil spring disposed within said cup shaped clutch elements so that the spring means tends to separate the clutch elements and the prong-like extensions resiliently urge the clutch elements into contact with each other to thereby provide a clutch that provides slippage when overloaded.

ROBERT C. RAYNER.

References Cited in the file of this patent

UNITED STATES PATENTS

| Number | Name | Date |
|---|---|---|
| 691,073 | Rabbeth | Jan. 14, 1902 |
| 923,043 | Gulick | May 25, 1909 |
| 1,441,643 | Toman | Jan. 9, 1923 |
| 1,777,829 | Edgecumbe | Oct. 7, 1930 |
| 2,090,411 | Eason | Aug. 17, 1937 |
| 2,271,883 | Bannister | Feb. 3, 1942 |
| 2,329,381 | Bannister | Sept. 14, 1943 |

FOREIGN PATENTS

| Number | Country | Date |
|---|---|---|
| 121,115 | Great Britain | 1919 |